United States Patent
Beskorovajnov et al.

(10) Patent No.: US 10,423,781 B2
(45) Date of Patent: Sep. 24, 2019

(54) PROVIDING DIFFERENTIALLY PRIVATE DATA WITH CAUSALITY PRESERVATION

(71) Applicant: SAP SE, Walldorf (DE)

(72) Inventors: Wasilij Beskorovajnov, Karlsruhe (DE); Daniel Bernau, Karlsruhe (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 15/701,826

(22) Filed: Sep. 12, 2017

(65) Prior Publication Data

US 2018/0322279 A1 Nov. 8, 2018

Related U.S. Application Data

(60) Provisional application No. 62/500,373, filed on May 2, 2017.

(51) Int. Cl.
| | |
|---|---|
| *G06F 21/55* | (2013.01) |
| *G06F 21/62* | (2013.01) |
| *G06F 16/215* | (2019.01) |
| *G06F 16/22* | (2019.01) |

(52) U.S. Cl.
CPC .......... *G06F 21/552* (2013.01); *G06F 16/215* (2019.01); *G06F 16/221* (2019.01); *G06F 21/6245* (2013.01); *G06F 21/6254* (2013.01)

(58) Field of Classification Search
CPC .. G06F 21/552; G06F 21/6254; G06F 16/221; G06F 16/215; G06F 21/6245
See application file for complete search history.

(56) References Cited

U.S. PATENT DOCUMENTS

| | | | |
|---|---|---|---|
| 2005/0159992 A1* | 7/2005 | Lawrence | G06Q 30/02 706/62 |
| 2015/0242887 A1* | 8/2015 | Agarwal | G06Q 30/0251 705/14.49 |
| 2017/0330221 A1* | 11/2017 | Bagheri | G06F 16/285 |
| 2018/0225581 A1* | 8/2018 | Oyamada | G06F 16/00 |
| 2019/0012573 A1* | 1/2019 | Oyamada | G06N 99/00 |

OTHER PUBLICATIONS

Miguel E. Andrés et al.; Geo-Indistinguishability: Differential Privacy for Location-Based Systems; Proceedings of the 2013 ACM SIGSAC Conference on Computer & Communications security; 14 pages; (http://dl.acm.org/citation.cfm?id=2516735).

(Continued)

*Primary Examiner* — Mohammed Waliullah
(74) *Attorney, Agent, or Firm* — Buckley, Maschoff & Talwalkar LLC

(57) ABSTRACT

A method is disclosed for providing sanitized log data to a threat detection system. The sanitized log data is derived from a log table with continuous columns, themselves having continuous entries with continuous values. First, a retention probability parameter and an accuracy radius parameter are selected. Next, a probability distribution function is initialized with the retention probability parameter and the accuracy radius parameter. For each continuous value, the probability distribution function is applied, resulting in perturbed continuous values of a perturbed continuous columns Finally, the perturbed continuous columns are provided as the sanitized log.

14 Claims, 5 Drawing Sheets

(56) References Cited

OTHER PUBLICATIONS

Konstantinos Chatzikokolakis et al.; Broadening the Scope of Differential Privacy Using Metrics; presented on Conference: Privacy Enhancing Technologies Symposium; 2013; 21 pages; (https://www.freehaven.net/anonbib/papers/pets2013/paper_57.pdf).
Benjamin C. M. Fung et al.; Privacy-Preserving Data Publishing: A Survey of Recent Developments; published in the journal of ACM Computing Surveys (CSUR); 2010; 53 pages; (http://dl.acm.org/citation.cfm?id=1749605).
Graham Cormode; Personal Privacy vs Population Privacy: Learning to Attack Anonymization; KDD '11 Proceedings of the 17th ACM SIGKDD international conference on Knowledge discovery and data mining; 9 pages; (https://pdfs.semanticscholar.org/1cd8/cd2bcdae06d72c7da16091f1c525221a58e8.pdf).
Graham Cormode et al; Differentially Private Summaries for Sparse Data; ICDT '12 Proceedings of the 15th International Conference on Database Theory; 2012; 13 pages; (http://dl.acm.org/citation.cfm?id=2274608).
Chris Clifton et al; On Syntactic Anonymity and Differential Privacy; 2013 IEEE 29th International Conference on Data Engineering Workshops (ICDEW); 6 pages; (http://ieeexplore.ieee.org/document/6547433/).
Benjamin Eze et al; Systematic Literature Review on the Anonymization of High Dimensional Streaming Datasets for Health Data Sharing; appers in Procedia Computer Science 63 (2015); 8 pages; (http://www.sciencedirect.com/science/article/pii/S1877050915024886).
Arpita Ghosh et al; Universally Utility-Maximizing Privacy Mechanisms; Proceedings of the forty-first annual ACM symposium on Theory of computing, 2009; 9 pages (http://dl.acm.org/citation.cfm?id=1536464).
Aleksandra Korolova et al; Releasing Search Queries and Clicks Privately; Proceedings of the 18th international conference on World wide web, 2009 (WWW '09); 10 pages; (http://dl.acm.org/citation.cfm?id=1526733).
Yvonne Mülle et al; Privacy-Integrated Graph Clustering Through Differential Privacy; Published in the Workshop Proceedings of the EDBT/ICDT 2015 Joint Conference; 8 pages (http://ceur-ws.org/Vol-1330/paper-39.pdf).
Hiep H. Nguyen et al; Detecting Communities under Differential Privacy; Proceedings of WPES'16, Oct. 24 2016, Vienna, Austria; 11 pages (http://dl.acm.org/citation.cfm?id=2994624).
Yonghui Xiao et al.; Protecting Locations with Differential Privacy under Temporal Correlations; Proceedings of the 22nd ACM SIGSAC Conference on Computer and Communications Security; 2015; 12 pages (http://dl.acm.org/citation.cfm?id=2813640).

\* cited by examiner

PROVIDING DIFFERENTIALLY PRIVATE DATA WITH CAUSALITY PRESERVATION

RELATED APPLICATIONS

The present patent application claims the priority benefit of the filing date of U.S. Provisional Application No. 62/500,373, filed 2 May 2017, titled "Providing Differentially Private Data with Causality Preservation", the content of which is incorporated herein by reference in its entirety.

BACKGROUND

Big data, open data, and data protection are three terms that represent the current tension between individual privacy, data-driven business, and politics. With every second a tremendous amount of data is being produced, consumed, and analyzed. Data analysis promises benefits such as process improvement, insights, and predictions of trends. For instance, it has been estimated that the European government could save more than 100 billion Euros in operational efficiency improvements alone by analyzing the "right" data. Corporations, academia and consumers thus potentially profit from effective data analytics. One of the biggest challenges is getting access to this "right" data.

Currently some governments provide global data access for analysis, like the European Open Data Portal or the Federal Statistical Office of Germany to name a few. Sharing data, however, may harm the individuals whose personally identifiable information ("PII") is contained in the data to be shared. A common example would be diabetes patient datasets from, hospitals where even the knowledge of the existence of an individual within the dataset may cause harm to the individual. This is due to the fact that an employee with diabetes causes higher costs for his or her company. Accordingly, such an insight about a person applying for a job may cause the hiring company to prefer other job candidates. This is in tension with the fact that having good datasets about patients with diabetes may provide important information regarding side effects and possible treatments. State of the art intrusion detection systems ("IDS") operate on data collected from various sensors. Sensors extract log data from information systems, network equipment or cyber-physical devices and send it to analytics systems. SAP Enterprise Threat Detection is one example of such a system. A challenge arising in such a setup, especially when the analytics system is operated in the cloud is the processing of personal data that is contained within the extracted logs. Thus, information of tremendous value for detecting threats and intrusions in the over 96,000 SAP systems often is not utilized.

Providing public access to personal data, such as SAP log data, is unlawful under certain circumstances in some jurisdictions such as in Germany, under the German privacy regulations, "Bundesdatenschutzgesetz". Even where personal data may be lawfully provided to data analysts under, for example, a data protection agreement, employees may be uncomfortable in the knowledge that their activities could be directly analyzed and potentially become personally identifiable.

Simply removing the names and PII from data ("de-identification") is generally not sufficient. In several well-known cases, data have been re-identified using publicly available information. For example, de-identified data was published by Netflix and AOL, and reporters and researchers were later able to re-identify users' usage and searches using information available on the Internet.

This problem is not only restricted to the analysis of network traffic but is also highly relevant to business process data as well. If business process data is analyzed for insights on efficiency, etc. then the employees whose data is being analyzed might be uncomfortable if the data can later be attributed to them.

Conventional data anonymization systems offer mechanisms to satisfy data protection requirements. Data perturbation involves modifying data in such a way to prevent re-identification. Data perturbation can be performed to a greater or lesser degree, resulting in correspondingly greater or lesser privacy. However, in some cases, perturbed data deviates so much from the original data that it becomes essentially useless to a data analyst. The level of usefulness of perturbed data is referred to as its "utility". In many cases, the greater the privacy, the lesser the utility and vice versa.

Epsilon-differential privacy is a mathematical definition of privacy that seeks to define a privacy parameter, epsilon, that quantifies the privacy risk posed by releasing perturbed sensitive data. Perturbed data can be provided in an "interactive" manner, meaning that the original data is perturbed "on the fly" in response to an interactive query. This kind of interactive perturbation can be done under epsilon-differential privacy to a specific value of the privacy parameter, but in practice, the interactive approach is limited in performance as well as in the number and types of queries that can be performed. By contrast, non-interactive or one-time perturbation is done prior to analysis rather than in response to a query. In connection with non-interactive perturbation, an entire perturbed dataset can be provided to data analysts who can then perform any number of arbitrary queries on the entire perturbed dataset.

Frank McSherry described an interactive differential privacy approach in a 2009 paper entitled "An Extensible Platform for Privacy-Preserving Data Analysis". The paper described perturbing single queries that are needed in order to perform intrusion detection. Such systems have several problems. The first problem relates to the general nature of perturbation, namely the inaccuracy of perturbed data, e.g., completely wrong ordering of events due to excessively perturbed timestamps. The second problem is the expression of data analysis in a high-level query language, whose expressibility is restricted by nature. This problem is specific to the interactive differential privacy approach, which is incorporated into the platform Privacy Integrated Queries (PINQ) from the McSherry paper.

A non-interactive input perturbation approach is described in a 2014 paper by Ulfar Erlingsson et al. entitled "RAPPOR: Randomized Aggregatable Privacy-Preserving Ordinal Response". The RAPPOR mechanism transforms values within a dataset into a bloom filter and randomizes the bits of the filter with the concept of randomized response. This means that the sample space in RAPPOR is a set of bloom filters, which allows for data mining algorithms to be applied immediately after the randomization of the dataset, without any further modifications on the algorithm steps or the randomized dataset. This random transformation, however, renders the dataset unuseful for many purposes, and advanced statistical decoding techniques must be applied to garner statistical information from the randomized Bloom-filter-based RAPPOR responses. Moreover, RAPPOR randomizes only discrete values and cannot operate on both discrete and continuous data with fine-grained designed utility guarantees. Furthermore, in the case of RAPPOR, the differential privacy definition requires that a neighboring dataset involves the modification of only a single record.

Much effort has been invested in the area of improvement of utility, see e.g. the 1998 paper from Gouweleeuw et al., entitled "Post Randomization for Statistical Disclosure Control: Theory and Implementation" (PRAM). PRAM is randomized response on an existing dataset after the data is generated or provided.

SUMMARY

Various embodiments of systems and methods for differentially private log data release with causality preservation are described herein. A novel approach for enabling privacy-preserving evaluation of datasets is disclosed, including the formulation of a novel differential privacy mechanism to allow anonymized release of log data under preservation of specific data utility, such as causality. An architecture for decentralized release and collaborative analysis of log data anonymized is specified. This enables an intrusion detection use case while at the same time providing privacy guarantees. These and other benefits and features of the embodiments will be apparent upon consideration of the following detailed description presented in connection with the following drawings.

BRIEF DESCRIPTION OF THE DRAWINGS

The claims set forth with particularity the claimed scope of the present disclosure. The disclosed embodiments are illustrated by way of example and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for differentially private log data release with causality preservation are described herein. In the following description, numerous specific details are set forth to provide a thorough understanding of the disclosure. A person of ordinary skill in the art will recognize, however, that the presented ideas can be practiced without one or more of the specific details, or with other methods, components, materials, etc. In other instances, well-known structures, materials, or operations are not shown or described in detail to avoid obscuring the present disclosure.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
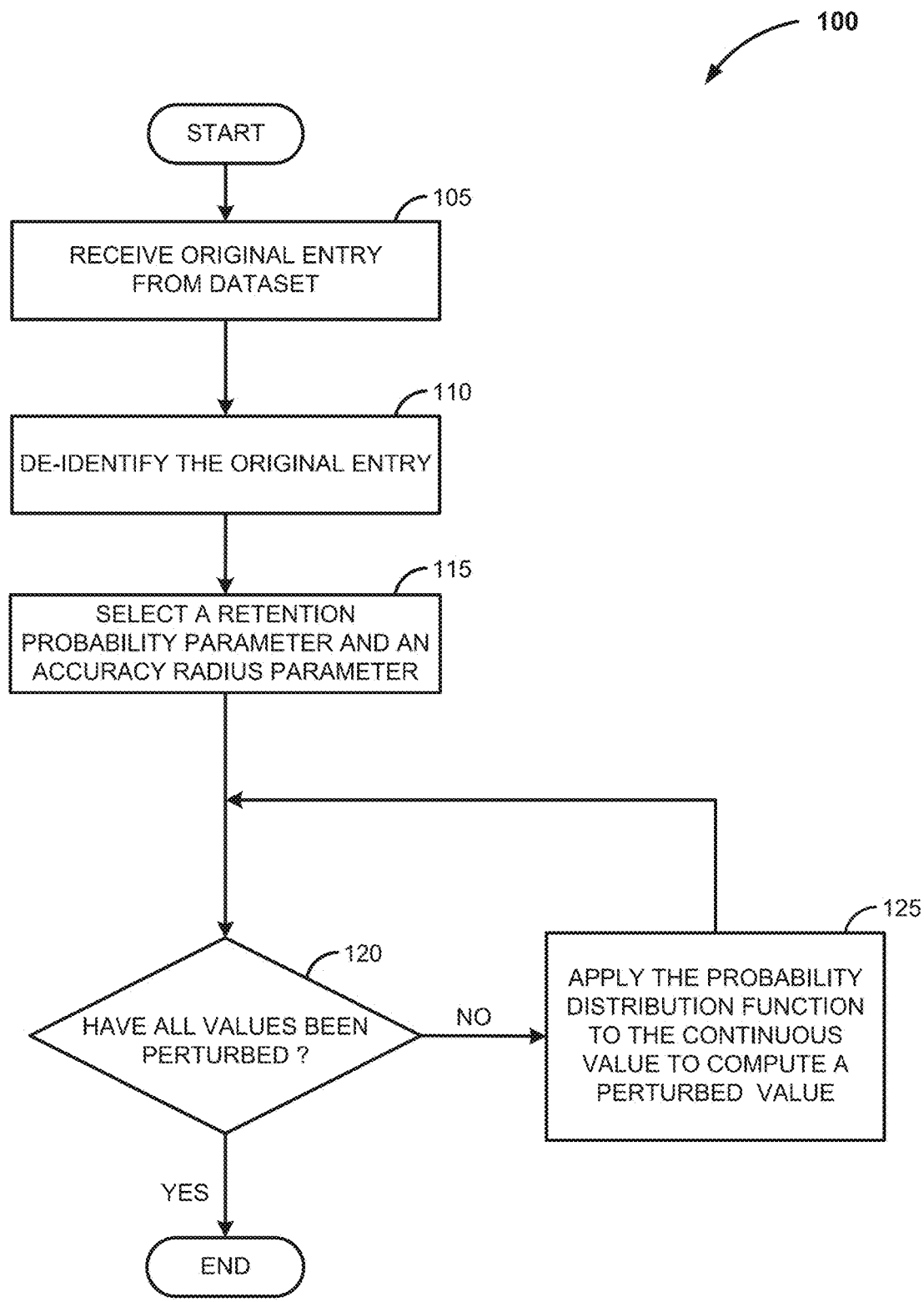
FIG. 1 is a flow diagram illustrating steps for perturbing a dataset of columns with continuous values.

FIG. 1 is a flow diagram 100 illustrating steps for perturbing a dataset of columns with continuous values. At step 105, an original entry is received from the dataset that is to be perturbed. In various embodiments, the dataset is a columnar table. It is understood that an arbitrary graph can be represented as a table. At step 110, the original entry is de-identified. In various embodiments, this de-identification step involves removing PII from the original entry or otherwise thoroughly obscuring it such as, for example, removing names and/or addresses associated with the entry or substituting random data for the PII. At step 115, a retention probability parameter and an accuracy radius parameter are selected. The retention probability parameter and accuracy radius parameter are further described in detail below. Next, at step 120 it is determined whether all values in the table have been perturbed. If so, the process is complete. Alternatively, at step 125, if values remain to be preserved, a probability distribution function ("PDF") is applied to the continuous value to calculate a perturbed value.

Figure 2:
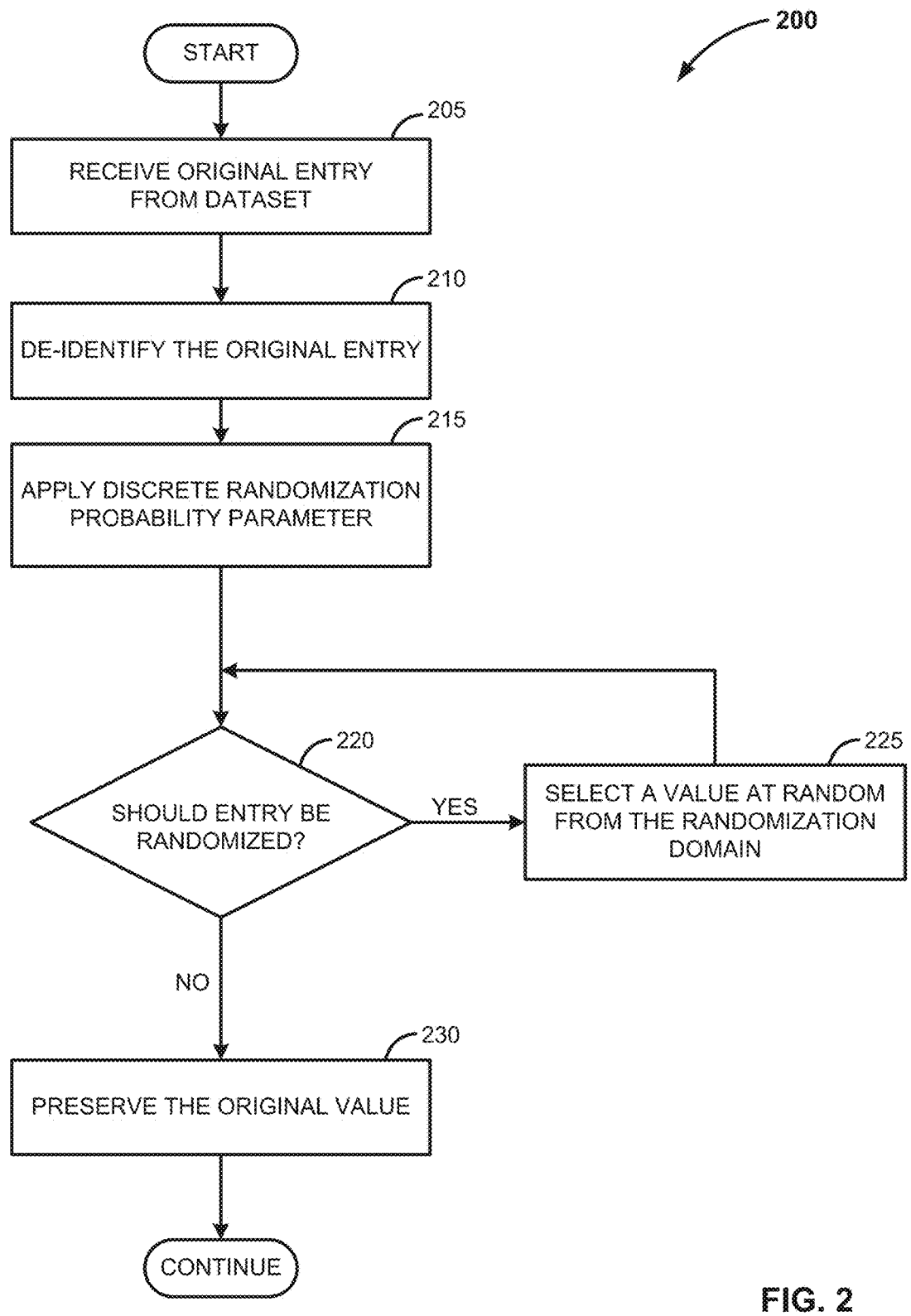
FIG. 2 is a flow diagram illustrating steps for perturbing a dataset of columns with discrete values.

FIG. 2 is a flow diagram 200 illustrating steps for perturbing a dataset of columns with discrete values. At step 205, an original entry is received from a dataset. As step 210, the original entry is de-identified similarly to how the original entry of flow diagram 100 of FIG. 1 is de-identified as described in connection with step, 110. At step 215, a discrete randomization probability parameter is applied. For example if the randomization probability is selected to be 0.2 then an event will be executed with a 20% probability of being true. At step 220, it is determined whether the entry should be randomized. This randomization can be implemented for example using a virtualized urn containing two balls that are labeled "true" and eight balls that are labeled "false". In the case of a ball labeled "true" being selected the application of the discrete randomization probability parameter is said to have succeeded. By contrast if a ball labeled "false" is selected the application is said to have failed.

If the randomization event is "true," i.e. if the application of the parameter succeeds, and the value should be randomized, then at step 225 a value is selected at random from the randomization domain. In various embodiments, the randomization domain is defined as a set of discrete inputs including the existing values of the elements of discrete columns. In various embodiments, other discrete values similar to the existing elements of the discrete columns can be added to the domain. It is noted that the greater the size of the randomization domain, the weaker the plausible deniability privacy will be. Similarly, the smaller the randomization parameter the weaker the privacy associated with the randomized response. If the randomization event is "false" then at step 230, the original value is preserved, and the process continues until each of the discrete values is perturbed.

Definition 1 (Epsilon-Differential Privacy Under Neighborhood)

An algorithm A is epsilon-differentially private under neighborhood if and only if, for all instances I, any I' where I' is in the set of neighbors(I) and any subset of outputs S in the subset of Range(A), the following holds:

$$Pr[A(I) \in S] \le e^\epsilon \cdot Pr[A(I') \in S]$$

Furthermore, a generic neighborhood definition is provided.

Definition 2 (m-Bounded, r-Attribute, Γ-Radii Neighborhood)

Let $r \in \{1, \ldots, d\}$, $m \in \{1, \ldots, n\}$, where n is the number of entries of a users' contribution within $R_1$ and d is the dimensionality of the table. Furthermore let $\Gamma := (\gamma_1, \gamma_2, \ldots, \gamma_{r_c})$ be the vector of maximal neighborhood deviations, where $r_c$ denotes the number of continuous columns, i.e. $r_c \leq d$.

Two tables $R_1 = (A_1, A_2, \ldots, A_d)$ and $R_2 = (A_1, A_2, \ldots, A_d)$ with columns $A_i$ over the same domains are neighboring tables if and only if:

$$|R_1| = |R_2|$$

$R_2$ can be obtained from $R_1$ by changing the values of exactly $r_c$ continuous attributes to values within the distances given through Gamma and by changing the values of exactly $r_d$ discrete attributes to values within the same domain of exactly m entries, such that $r_c + r_d = r$ and $r \leq d$.

$N_{m-bnd}^{r-attr, \Gamma-rad}(R_1)$ is the set of all neighboring tables of table $R_1$ according to this definition.

In connection with the present disclosure, the terms "attribute" and "bounded" are used as described in the 2011 entitled paper "No Free Lunch in Data Privacy" by Daniel Kifer et al. Attribute differential privacy corresponds to the situation where an attacker has full information about a database except for one attribute of one record. Bounded differential privacy derives its name from the fact that all of the associated datasets have a fixed size while unbounded differential privacy has no such restriction. Definition 1 together with Definition 2 can be seen as a combination of "bounded" differential privacy and "attribute" differential privacy. In this context bounded differential privacy is epsilon-differential privacy under an arbitrary I-bounded, r-attribute neighborhood. The same can be said about "attribute" differential privacy, which is epsilon-differential privacy under an arbitrary I-bounded, I-attribute neighborhood.

The present teachings combine aspects of two different anonymization techniques, differential privacy and randomized response. While the concept of differential privacy as set forth in the 2006 paper by Cythia Dwork entitled "Differential Privacy" is a strictly formal privacy definition, the concept of randomized response is rather a perturbation procedure with heterogeneous privacy guarantees and has been used within the research field of sensitive interviews as the randomized response technique ("RRT"). While both have their pros and cons, the present teachings illustrate mechanisms for anonymizing datasets while preserving utility, including an application to the use case of privacy preserving intrusion detection.

To begin, new and generalized definitions for differential privacy are established. A mechanism satisfying these privacy definitions will satisfy accepted definitions of differential privacy. Beneficially, the present teachings are not restricted to a specific neighbor of the dataset (i.e. a single changed row). As disclosed herein, a neighborhood of a dataset is a set of "similar" datasets, which can be obtained by changing one or more specific values of the original dataset. If differential privacy for neighbored datasets, which are "very similar" to the original one, can be guaranteed then, although the mechanism will satisfy the definition of differential privacy, the level of guaranteed privacy may be relatively smaller. In other words, guaranteeing Differential Privacy for a specific neighborhood is the same as guaranteeing the indistinguishability between the original dataset and its neighbors. Thus, the more neighbors the bigger the level of preserved privacy. To this end, we have adapted the general definition of differential privacy for graphs from the 2009 paper by Michael Hay et al. entitled "Accurate Estimation of the Degree Distribution of Private Networks" into a more general form of differential privacy for arbitrary datasets.

In various embodiments, single time anonymization, i.e. differentially private, non-interactive input perturbation is provided by way of utility oriented perturbation of columns with continuous domains. In an embodiment, a continuous column represents timestamps, and it is possible to substantially preserve the order of the perturbed timestamps which results in the preservation of causality to a degree that depends on the choice of the accuracy radius parameter. In this way, any table or graph-based dataset can be anonymized while preserving utility.

Moreover, the perturbation steps can be completely distributed, i.e. doubling the number of threads halves the running time. Therefore, the burden of perturbation calculation time is significantly lowered. All perturbation steps are independent from each other, which is to say that the greater the number of processors that can be deployed, the faster a complete database can be perturbed.

The sanitized data can be analyzed with an arbitrary number of queries enabling unlimited use of data mining algorithms. The present teachings have the additional advantage of being robust even in the event that a successful attack can be mounted against either a specific computer implementation of an aspect of the epsilon-differential privacy, such as a defect associated with rounding of continuous numbers or the implementation of the Laplace noise generation. This is because the present teachings involve both the perturbation with noise as well as the introduction of randomized response. Additionally, future results in the research around those concepts and improvements in the area of computer implemented continuous numbers can be applied to the present teachings. Furthermore, if some aspect of the epsilon-differential privacy guarantee is ultimately found not to provide adequate privacy, and participants in the dataset can somehow be re-identified, the participant's information is still protected by the plausible deniability privacy associated with the use of randomized response.

Causality Preserving Differential Privacy

For a time-ordered sequence of events $E := (e_1 < e_2 < \ldots < e_n)$ it can be said that the causality of E is preserved if the perturbation of timestamps in steps 14 through 21 of algorithm 1 (below) does not change the time-order of the events in E, thus $E^* = E := (e_1 < e_2 < \ldots < e_n)$. If the sequence of events is caused by a particular stimulus (i.e. attack) then preserving the causality of E means retaining precisely the order of events, which is the goal of network intrusion and threat detection systems. This causality preservation can be achieved in connection with the present teachings by selecting a retention radius $\Delta_{ts}$ for a timestamp as the half of the smallest difference to a successive timestamp, i.e. concentrating probability mass of size $\rho_{ts}$ around the interval $\Delta_{ts}$. The ordering of timestamps is preserved if every randomly perturbed timestamp is not more than $\Delta_{ts}$ different to its original timestamp. The lower bound for the probability of causality preservation is then $(\rho_{ts})^n$, where n is the number of events in N. It is noted that this lower bound is valid if and only if the timestamps are solely randomized, otherwise the lower bound needs to be multiplied by the probability that the events themselves are retained and not randomized.

Alogrithm 1 $(A_1, A_2, \ldots, A_d)$-log randomization (LogRand($(A_1, A_2, \ldots, A_d)$))

1: procedure PERTURBLOG($R = (A_1, A_2, \ldots, A_d)$)
2:     Initialize the table $R^* = (A_1, A_2, \ldots, A_d)$
    ▷ Randomized Response on discrete colums $A_l$ with $l \in \mathcal{L}_{discrete}$, where $\mathcal{L}_{discrete}$ is the set of indices that represent discrete columns in R.
3:     $\forall A_l: l \in \mathcal{L}_{discrete}$ choose the parameter $s_l$
4:     $\forall A_l: l \in \mathcal{L}_{discrete}$ determine the domain $D(A_l)$, with $|D(A_l)| = c_l$.
5:     for all $l \in \mathcal{L}_{discrete}$ do
6:         for all $a_i^l \in A_l$ do
7:             if $a_i^l$ is chosen with probability $1-s_l$ then    ▷ Preservation
8:                 set $a_i^{l,*} = a_i^l$ in $R^*$
9:             else    ▷ Randomization
10:                 $a_i^{l,*} \xleftarrow{u} D(A_l)$
11:             end if
12:         end for
13:     end for
    ▷ Randomized Response on continuous columns $(A_k)$ with $k \in \mathcal{K}_{contin}$, where $\mathcal{K}_{contin}$ is the set of indices that represent continuous columns in R.
14:     $\forall A_k: k \in \mathcal{K}_{contin}$ choose the retention probability $\rho_k$
15:     $\forall A_k: k \in \mathcal{K}_{contin}$ choose the accuracy radius $\Delta_k$
16:     $\forall A_k: k \in \mathcal{K}_{contin}$ Initialize Laplace pdf with:

$$\sigma_{\rho_k, \Delta_k} = -\frac{\Delta_k}{\ln(1-\rho_k)} \rightarrow f(z) := \frac{1}{2 \cdot \sigma_{\rho_k,\Delta_k}} \cdot e^{-\frac{|z-b_i^k|}{\sigma_{\rho_k,\Delta_k}}} \text{ and } \int_{b_i^k - \Delta_k}^{b_i^k + \Delta_k} f(z) dz = \rho_k$$

17:     for all $k \in \mathcal{K}_{contin}$ do
18:         for all $b_i^k \in Ak$ do
19:             $b_i^{k,*} \xleftarrow{\mathbb{R}} \text{Lap}(b_i^k, \sigma_{\rho,\Delta})$
20:         end for
21:     end for
22:     return $R^*$
23: end procedure

Theorem 1 (Differential Privacy Guarantees of LogRand)

LogRand guarantees $\epsilon$-differential privacy under m-Bounded, d-attribute, $\Gamma := (\gamma_1, \gamma_2, \ldots, \gamma_{r_c})$-Radii Neighborhood for $$\epsilon \geq m \cdot \left( \sum_{l \in L_{discrete}} \ln\left(\frac{c_l}{s_l} + (1-c_l)\right) + \sum_{k \in K_{contin}} \frac{\gamma_k}{\sigma_k} \right)$$

with $S_l \in (0,1]$, $L_{discrete}$ being the set of discrete columns and $K_{contin}$ the set of continuous columns, $|K_{contin}| = r_c$ and $|L_{discrete}| + |K_{contin}| = d$ Proof Fix an arbitrary d-dimensional log instance I consisting of discrete columns $A_l$ with $l \in L_{discrete}$ and continuous columns $A_k$ with $k \in K_{contin}$. Without loss of generality we assume that the first $|L_{discrete}|$ columns are discrete and the remaining are continuous, see table 1. Note that the depicted dataset in tables 1 and 2 is the dataset instance I at hand and not an arbitrary example. For the sake of compactness, we will use L as a shortcut for $L_{discrete}$ and K as a shortcut for $K_{contin}$.

TABLE 1

Instance I with discrete columns on the left and continuous on the right

| Discrete Columns | | Continuous Columns | |
|---|---|---|---|
| $A_1$ ... $A_{|\mathcal{L}|}$ | | $A_{|\mathcal{L}|+1}$ ... $A_{|\mathcal{L}|+|\mathcal{K}|}$ | |
| ... ... | | ... ... | |
| ... ... | | ... ... | |
| ... ... | | ... ... | |
| ... ... | | ... ... | |

Let $a_i^l$ be the values of the discrete l-th column in I, $b_i^k$ be the values of the continual k-th column and let $N_{m\text{-}bnd}^{d\text{-}attr,\,r\text{-}rad}(I)$ be as in definition 2. The following table depicts the proposed notation.

TABLE 2

Instance I with discrete columns on the
left and continuous on the right

| Discrete Columns | | | Continuous Columns | | |
|---|---|---|---|---|---|
| $A_1$ | ... | $A_{|\mathcal{L}|}$ | $A_{|\mathcal{L}|+1}$ | ... | $A_{|\mathcal{L}|+|\mathcal{K}|}$ |
| $a_1^1$ | ... | $a_1^{|\mathcal{L}|}$ | $b_1^{|\mathcal{L}|+1}$ | ... | $b_1^{|\mathcal{L}|+|\mathcal{K}|}$ |
| $a_2^1$ | ... | $a_2^{|\mathcal{L}|}$ | $b_2^{|\mathcal{L}|+1}$ | ... | $b_2^{|\mathcal{L}|+|\mathcal{K}|}$ |
| ... | ... | ... | ... | ... | ... |
| $a_n^1$ | ... | $a_n^{|\mathcal{L}|}$ | $b_n^{|\mathcal{L}|+1}$ | ... | $b_n^{|\mathcal{L}|+|\mathcal{K}|}$ |

Let $S:=\{\omega_1, \omega_2, \ldots\}$ be an arbitrary subset of the sample space from LogRand, i.e., a set of tables as in table 2. In order to achieve $\epsilon$-Differential Privacy under m-Bounded, d-Attribute, $\Gamma:=(\gamma_1, \gamma_2, \ldots, \gamma_{r_c})$-Radii Neighborhood the algorithm LogRand needs to satisfy the following inequality $\forall\ I' \in N_{m\text{-}bnd}^{d\text{-}attr,\Gamma\text{-}rad}(I)$:

$$Pr[\text{LogRand}(I) \in S] \leq e^\epsilon \cdot Pr[\text{LogRand}(I') \in S] \quad \text{Equation 1:}$$

The probability for a single elementary event will be 0, as we are going to sample from a probability distribution function for continuous columns. In the following $\overline{\omega}_i$ will denote special sets of elementary events from S, which we call elementary subsets $\overline{\omega}_i \subseteq S$. The elementary subsets will span S completely, thus $S = \cup_i \overline{\omega}_i$.

De-constructing S into its elementary subsets leads to a sum over their emission probabilities.

$$\Sigma_i Pr[\text{LogRand}(I) \in \overline{\omega}_i] \leq e^\epsilon \cdot \Sigma_i Pr[\text{LogRand}(I') \in \overline{\omega}_i] \quad \text{Inequality 2:}$$

Now we need an estimation for the probabilities $Pr[\text{LogRand}(I) \in \overline{\omega}_i]$. To this end we will estimate the probability for an arbitrary $\overline{\omega}$.

We will describe $\overline{\omega}$ as a vector of special sets of columns $(\omega_{A_1}, \omega_{A_2}, \ldots, \omega_{A_d})$ where $\omega_{A_j}$ denotes the set of j-th columns that appear at least once within a dataset $\omega_i \in \overline{\omega}$. An example of such set is depicted in tables 3 and 4.

TABLE 3

First column of the dataset instance I s.t. $A_1 \in \omega_{A1}$

| $A_1$ |
|---|
| $a_1^1$ |
| $a_2^1$ |
| ... |
| $a_n^1$ |

TABLE 4

Exemplary set $\omega_{A_1}$ of occurring first colums with $A_1$ from our dataset instance I $$\left\{ \begin{array}{|c|} \hline A_1 \\ \hline a_1^1 \\ \hline a_2^1 \\ \hline \ldots \\ \hline a_n^1 \\ \hline \end{array}, \begin{array}{|c|} \hline A_1^1 \\ \hline a_1^{1,1} \\ \hline a_2^{1,1} \\ \hline \ldots \\ \hline a_n^{1,1} \\ \hline \end{array}, \begin{array}{|c|} \hline \ldots \\ \hline \ldots \\ \hline \ldots \\ \hline \ldots \\ \hline \ldots \\ \hline \end{array}, \begin{array}{|c|} \hline A_1^{|\omega_{A_1}|} \\ \hline a_1^{1,|\omega_{A_1}|} \\ \hline a_2^{1,|\omega_{A_1}|} \\ \hline \ldots \\ \hline a_n^{1,|\omega_{A_1}|} \\ \hline \end{array} \right\}$$

We require for all elementary events $\omega_i \in \overline{\omega}$, that they are invariant in their categorical/discrete columns identified by the index set $L_{discrete}$, i.e. $\forall \omega_{A_j} : l \in L_{discrete}$ consists of a single column. In other words, $\overline{\omega}$ encompasses all events that have a specific combination of values of categorical/discrete columns in common but varying in their continuous columns. The effect of this requirement can be seen in table 5, where the first discrete column of our arbitrary dataset is identical between all $\omega_i \in \overline{\omega}$, thus $\omega_{A_1}$ consists effectively of a single column.

TABLE 5

Set $\omega_{A_1}$ collaping to a single column due to the invariance of the discret column $A_1$. This table demonstrates that all columns are identical to each other.

$$\left\{ \begin{array}{|c|} \hline A_1 \\ \hline a_1^1 \\ \hline a_2^1 \\ \hline \ldots \\ \hline a_n^1 \\ \hline \end{array}, \begin{array}{|c|} \hline A_1^1 \\ \hline a_1^{1,1} \\ \hline a_2^{1,1} \\ \hline \ldots \\ \hline a_n^{1,1} \\ \hline \end{array}, \begin{array}{|c|} \hline \ldots \\ \hline \ldots \\ \hline \ldots \\ \hline \ldots \\ \hline \ldots \\ \hline \end{array}, \begin{array}{|c|} \hline A_1^{|\omega_{A_1}|} \\ \hline a_1^{1,|\omega_{A_1}|} \\ \hline a_2^{1,|\omega_{A_1}|} \\ \hline \ldots \\ \hline a_n^{1,|\omega_{A_1}|} \\ \hline \end{array} \right\} \cong \begin{array}{|c|} \hline A_1 \\ \hline a_1^1 \\ \hline a_2^1 \\ \hline \ldots \\ \hline a_n^1 \\ \hline \end{array}$$

As required in the beginning the first $\omega_{A_j} : 1 \leq j \leq |L|$ are the discrete columns and the remaining $\omega_{A_j} : |L|+1 \leq j \leq d$ are the continuous columns. Each discrete $\omega_{A_j} : \forall l \in L$ can be described with a single vector of values $a_i^{l,*} : 1 \leq i \leq n$ because we required that the discrete columns are all the same between all datasets within $\overline{\omega}$. Table 6 depicts the nomenclature for an arbitrary discrete column $A_l$.

TABLE 6

Set $\omega_{A_l}$ collapsing to a single clumn die to the incariance of the l-th discret column $A_l$ with the new nomenclature $$\left\{ \begin{array}{|c|} \hline A_l \\ \hline a_1^l \\ \hline a_2^l \\ \hline \ldots \\ \hline a_n^l \\ \hline \end{array}, \begin{array}{|c|} \hline A_l^1 \\ \hline a_1^{l,1} \\ \hline a_2^{l,1} \\ \hline \ldots \\ \hline a_n^{l,1} \\ \hline \end{array}, \begin{array}{|c|} \hline \ldots \\ \hline \ldots \\ \hline \ldots \\ \hline \ldots \\ \hline \ldots \\ \hline \end{array}, \begin{array}{|c|} \hline A_l^{|\omega_{A_l}|} \\ \hline a_1^{l,|\omega_{A_l}|} \\ \hline a_2^{l,|\omega_{A_l}|} \\ \hline \ldots \\ \hline a_n^{l,|\omega_{A_l}|} \\ \hline \end{array} \right\} \cong \begin{array}{|c|} \hline A_l \\ \hline a_1^l \\ \hline a_2^l \\ \hline \ldots \\ \hline a_n^l \\ \hline \end{array} \cong \begin{array}{|c|} \hline A_l^* \\ \hline a_1^{l,*} \\ \hline a_2^{l,*} \\ \hline \ldots \\ \hline a_n^{l,*} \\ \hline \end{array}$$

A similar approach can be taken with the sets of continuous columns $\omega_{A_k} : \forall k \in K$, which differs in a subtle way in that each $\omega_{A_k}$ is a set of uncountably many different columns of size n. If $\omega_{A_k}$ were countable, then the probability would be 0 in the same way it would be for a single event and as a consequence the probability of the overall $\overline{\omega}$ would also be 0.

In the following we will change the view on such an $\omega_{A_k}$ such that it will consist only of one column with each value being a set of occurring values. This can be done by merging every column from $\omega_{A_k}$ into one, such that all values within an entry being gathered together into multiple intervals. Now $\omega_{A_k}$ can be depicted as a single vector of sets of values $b_i^{k,*} : 1 \leq i \leq n$. As each $b_i^{k,*}$ is in general a set of continuous intervals from $\mathbb{R}$

TABLE 7

This table depicts an exemplary merge of continuous columns from the set $\omega_{A_k}$. However, for the sake of simplicity we assume within this illustration that the values $b_i^{k,j}$: min ≤ j ≤ max span a single interval, thus $[b_i^{k,min}, b_i^{k,max}] = \{x \in \mathbb{R} : b_i^{k,min} \leq x \leq b_i^{k,max}\}$. $A_k^{min/max}$ denotes the column from $\omega_{A_k}$ with smallest/largest timestamps.
The set $\omega$ can be rewritten now into a set of entries of the form $(a_i^{1,*}, a_i^{2,*}, \ldots, a_i^{|\mathcal{L}|,*}, b_i^{|\mathcal{L}|+1,*}, b_i^{|\mathcal{L}|+2,*}, \ldots, b_i^{|K|,*})$
with $b_i^{k,*} \subset \mathbb{R}$ and $\forall_i: 1 \leq i \leq n$.

| $A_k^{min}$ | ... | $A_k^{max}$ | | $A_k^*$ |
|---|---|---|---|---|
| $b_1^{k,min}$ | ... | $b_1^{k,max}$ | ≅ | $b_1^{k,*} := [b_1^{k,min}, b_1^{k,max}]$ |
| $b_2^{k,min}$ | ... | $b_2^{k,max}$ | | $b_2^{k,*} := [b_2^{k,min}, b_1^{k,max}]$ |
| ... | ... | ... | | ... |
| $b_n^{k,min}$ | ... | $b_n^{k,max}$ | | $b_n^{k,*} := [b_n^{k,min}, b_1^{k,max}]$ |

TABLE 8

Arbitrary elementary subset $\overline{\omega}$

| Discrete Columns | | Continuous Columns | | |
|---|---|---|---|---|
| $A_1^*$ | ... | $A_{|\mathcal{L}|}^*$ | $A_{|\mathcal{L}|+1}^*$ | ... $A_{|\mathcal{L}|+|K|}^*$ |
| $a_1^{1,*}$ | ... | $a_1^{|\mathcal{L}|,*}$ | $b_1^{|\mathcal{L}|+1,*}$ | ... $b_1^{|\mathcal{L}|+|K|,*}$ |
| $a_2^{1,*}$ | ... | $a_2^{|\mathcal{L}|,*}$ | $b_2^{|\mathcal{L}|+1,*}$ | ... $b_2^{|\mathcal{L}|+|K|,*}$ |
| ... | ... | ... | ... | ... |
| $a_n^{1,*}$ | ... | $a_n^{|\mathcal{L}|,*}$ | $b_n^{|\mathcal{L}|+1,*}$ | ... $b_n^{|\mathcal{L}|+|K|,*}$ |

As $b_i^{k,*} \subset \mathbb{R}$ may consists of multiple intervals from $\mathbb{R}$ we require for each $b_i^{k,*}$ that:

$$\int_{(b_i^{k,*})} \frac{1}{2 \cdot \sigma} \cdot e^{-\frac{|z - b_i^k|}{\sigma}} dz$$

exists. Remember that $b_i^k$ is the original real value from our arbitrary dataset instance I, see table 2.

Finally, we can compute the necessary probabilities. The probability that the algorithm LogRand with the input of I, see table 2, outputs a dataset from the elementary subset $\overline{\omega}$ can be computed as:

$$Pr[LogRand(I) \in \overline{\omega}] = \Pi_{l \in L} \Pi_{a_i^{l,*} \in A_l^*} Pr[a_i^l \to a_i^{l,*}] \cdot \Pi_{k \in K} \Pi_{b_i^{k,*} \in A_k^*} Pr[Lap(b_i^k, \sigma_{\rho,\Delta}) \in b_i^{k,*}]$$

Equation 3:

Now if we take $I' \in N_{m-bnd}^{d-attr, \Gamma-rad}(I)$ with $a_i^{l'}$ being the values of the discrete l-th column in I', $b_i^{k'}$ being the values of the continual k-th column of I', and compute the quotient with equation 3 most of the factors will be reduced due to the neighborhood property of I' to I. This means that for all except m entries it holds for the values within those entries $a_i^{l'} = a_i^l$ and $b_i^{k'} = b_i^k$, w.l.o.g. let U} be the set of indices s.t. $\forall u \in U: a_u^l \neq a_u^{l'}$ and $b_u^k \neq b_u^{k'}$ and $|U| = m$.

$$\frac{Pr[LogRand(I) \in \overline{\omega}]}{Pr[LogRand(I') \in \overline{\omega}]} = \frac{\prod_{l \in L} \prod_{a_i^{l,*} \in A_l^*} Pr[a_i^l \to a_i^{l,*}] \cdot \prod_{k \in K} \prod_{b_i^{k,*} \in A_k^*} Pr[Lap(b_i^k, \sigma_{\rho,\Delta}) \in b_i^{k,*}]}{\prod_{l \in L} \prod_{a_i^{l,*} \in A_l^*} Pr[a_i^{l'} \to a_i^{l,*}] \cdot \prod_{k \in K} \prod_{b_i^{k,*} \in A_k^*} Pr[Lap(b_i^{k'}, \sigma_{\rho,\Delta}) \in b_i^{k,*}]} =$$

Equation 4

$$\frac{\prod_{l \in L} \prod_{u \in U} Pr[a_u^l \to a_u^{l,*}] \cdot \prod_{k \in K} \prod_{u \in U} Pr[Lap(b_u^k, \sigma_{\rho,\Delta}) \in b_u^{k,*}]}{\prod_{l \in L} \prod_{u \in U} Pr[a_u^{l'} \to a_u^{l,*}] \cdot \prod_{k \in K} \prod_{u \in U} Pr[Lap(b_u^{k'}, \sigma_{\rho,\Delta}) \in b_u^{k,*}]} \leq$$

$$(1) \frac{\prod_{l \in L} \prod_{u \in U} Pr[a_u^l \to a_u^{l,*}]}{\prod_{l \in L} \prod_{u \in U} Pr[a_u^{l'} \to a_u^{l,*}]} \cdot \prod_{k \in K} \left(e^{\frac{\gamma_k}{\sigma_k}}\right)^m$$

The transformation (1) is due to the fact that the quotient of two Laplacian probability distribution functions is e to the power of the difference of their means, which is the $\gamma_k$ radius and scale $\sigma_k$. The exponent m comes from the fact that the products have m factors.

This transformation is known in the literature of differential privacy. This is comparable to the proof of the interactive Laplacian Mechanism from the 2006 paper by Dwork, cited above.

The numerator of the first product on the right hand side of equation 4 is maximal if $\forall l \in L$, $\forall u \in U$: $a_u^l = a_u^{l,*}$, i.e., those are the events that the discrete values $a_u^l$ with $u \in U$ of l have been retained. The probability for a single event of retention is $$(1-s_l) + \frac{1}{c_l} \cdot s_l$$

and the probability that m such events happen consecutively is $$\left((1-s_l) + \frac{1}{c_l} \cdot s_l\right)^m$$

The denominator of the first product on the right hand side of equation 4 is minimal if $\forall l \in L$, $\forall u \in U$: $a_u^l \neq a_u^{l,*}$. The probability, following the same argument as above for m events of non-retention, is $$\left(\frac{1}{c_l} \cdot s_l\right)^m.$$

Now we can estimate equation 4 with the following inequality:

$$\frac{Pr[LogRand(I) \in \overline{\omega}]}{Pr[LogRand(I') \in \overline{\omega}]} \leq \quad \text{Inequality 5}$$

$$\frac{\prod_{l \in L} \prod_{u \in U} Pr[a_u^l \to a_u^{l,*}]}{\prod_{l \in L} \prod_{u \in U} Pr[a_u^{l'} \to a_u^{l,*}]} \cdot \prod_{k \in K}\left(e^{\frac{\gamma_k}{\sigma_k}}\right)^m \leq$$

$$\frac{\prod_{l \in L}\left((1-s_l) + \frac{1}{c_l} \cdot s_l\right)^m}{\prod_{l \in L}\left(\frac{1}{c_l} \cdot s_l\right)^m} \cdot \prod_{k \in K}\left(e^{\frac{\gamma_k}{\sigma_k}}\right)^m =$$

$$\prod_{l \in L} \frac{\left((1-s_l) + \frac{1}{c_l} \cdot s_l\right)^m}{\left(\frac{1}{c_l} \cdot s_l\right)^m} \cdot \prod_{k \in K}\left(e^{\frac{\gamma_k}{\sigma_k}}\right)^m =$$

$$\prod_{l \in L}\left(\frac{c_l}{s_l} + (1-c_l)\right)^m \cdot \prod_{k \in K}\left(e^{\frac{\gamma_k}{\sigma_k}}\right)^m =$$

$$\left(\prod_{l \in L}\left(\frac{c_l}{s_l} + (1-c_l)\right) \cdot \prod_{k \in K}\left(e^{\frac{\gamma_k}{\sigma_k}}\right)\right)^m$$

Overall we can conclude that:

$$Pr[LogRand(I) \in \overline{\omega}] \leq \quad \text{Inequality 6}$$

$$\left(\prod_{l \in L}\left(\frac{c_l}{s_l} + (1-c_l)\right) \cdot \prod_{k \in K}\left(e^{\frac{\gamma_k}{\sigma_k}}\right)\right)^m \cdot Pr[LogRand(I') \in \overline{\omega}]$$

As we picked $\overline{\omega}$ arbitrarily we can estimate every summand of the left hand side of inequality 2 with inequality 6 and factor out the common factor:

$$\sum_i Pr[LogRand(I) \in \overline{\omega}_i] \leq \quad \text{Inequality 7}$$

$$\left(\prod_{l \in L}\left(\frac{c_l}{s_l} + (1-c_l)\right) \cdot \prod_{k \in K}\left(e^{\frac{\gamma_k}{\sigma_k}}\right)\right)^m \cdot$$

$$\sum_i Pr[LogRand(I') \in \overline{\omega}_i]$$

Generalizing to a higher event level of the whole arbitrary subset S, we can finally prove the theorem.

$$Pr[LogRand(I) \in S] \leq \quad \text{Inequality 8}$$

$$\left(\prod_{l \in L}\left(\frac{c_l}{s_l} + (1-c_l)\right) \cdot \prod_{k \in K}\left(e^{\frac{\gamma_k}{\sigma_k}}\right)\right)^m \cdot Pr[LogRand(I') \in S]$$

Guaranteeing that $\left(\prod_{l \in L}\left(\frac{c_l}{s_l} + (1-c_l)\right) \cdot \prod_{k \in K}\left(e^{\frac{\gamma_k}{\sigma_k}}\right)\right)^m \leq$ $e^\epsilon$ requires that $m \cdot \left(\sum_{l \in L} \ln\left(\frac{c_l}{s_l} + (1-c_l)\right) \cdot \sum_{k \in K} \frac{\gamma_k}{\sigma_k}\right) \leq$ $\epsilon$ which proves the theorem.

In practice, there are implementation challenges. Specifically, algorithm 1 uses continuous noise, which can only be approximated using a digital computer. However, if implemented properly (see the discussion below) then the implementation will preserve the theoretical properties and the differential privacy guarantees will hold. For the case of discrete columns, a binomial distribution can be employed for deciding whether to keep the original value or not with a probability of success of $$(1-s) + \frac{1}{c_l} \cdot s.$$

In case of failure, a discrete value can be drawn uniformly out of the original domain excluding the original value. With the use of a properly-seeded cryptographic pseudo random number generator the implemented uniform drawing can be expected not to differ significantly from the theoretical definition. Finally, it is not believed that the finite precision of a computer might open weaknesses of common implementations of binomial distribution resulting in a violation of the theoretical random response (plausible deniability) privacy guarantee.

On the other hand, there are known weaknesses associated with computer implemented floating point Laplace noise. In a paper from 2012 by Ilya Mironov, entitled "On Significance of the Least Significant Bits for Differential Privacy" it is shown that the finite precision in fact might violate the guarantee of differential privacy if the Laplace noise is not implemented properly. The Mironov paper posits a side-channel attack on a common implementation of the Laplacian sampling, which is called the inverse sampling method. Moreover, the Mironov paper provides an approach to mitigate this attack, see e.g. chapter 5 of the Mironov paper. In this so called "snapping mechanism," rather than rounding or smoothing the floating point values associated with Laplacian noise to be used in perturbing a data element, the floating point representation of the Laplacian noise is first added to the data element and is then rounded or smoothed by, for example, discarding the least significant bits of the resulting value. In various embodiments, implementations of algorithm 1 apply such an approach to result in an implementation that is resistant to such a side-channel attack and as shown in the Mironov paper provably epsilon-differentially private.

Figure 3:
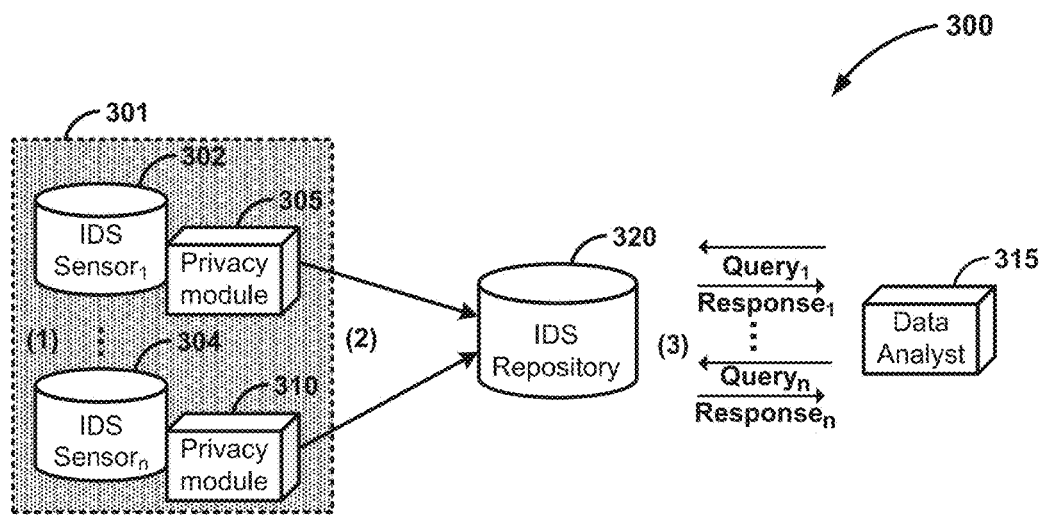
FIG. 3 is a block diagram illustrating a system for analyzing information about an intrusion detection system while preserving privacy.

FIG. 3 is a block diagram illustrating a system for analyzing information about an intrusion detection system ("IDS") 300 while preserving privacy. Data owner 301 controls a number 'n' IDS sensors 302, 304, which have associated privacy modules 305 and 310. In various embodiments, the privacy modules 305 and 310 perform one-time, non-interactive epsilon-differentially private perturbation of data entries associated with the IDS sensors. In various embodiments, this results in distributed mixture of sensor data from hosts and network components. Once the associated data entries are perturbed by the privacy modules 305 and 310, the perturbed data entries are transmitted and stored in an IDS repository 320. In various embodiments, the IDS repository 320 can be a database system such as an SAP HANA database. It is understood that other data repositories could be used alternatively. In connection with the IDS 300, a data analyst 315 can issue an arbitrary number of queries of any kind which are then responded to by the IDS repository 320. In various embodiments, IDS 301 is used for the differentially private release of data from the IDS sensors 302 and 304 to the IDS repository 320, where data analysts design and validate novel IDS algorithms through an adaptive series of statistical queries.

In various embodiments the IDS system 301 is provided as an application that takes an original log L as input from an IDS sensor, applies a differential privacy transformation, consistent with the present teachings, and releases a sanitized log L'. As disclosed herein, log data from SAP Systems such as SAP ECC, CRM or SCM can be used as data sources. In various embodiments, this log data takes the form of the Business Transaction Log (also known as ABAP statistics records; e.g. called transactions) and Security Audit Log (e.g. tracking of downloaded bytes for functions or transactions that are called in connection with a particular ABAP program). Information from these two logs is on the one hand highly personalized, as for example the Business Transaction Log contains one log line for each access of a user to a specific transaction. On the other hand, the information is very valuable for intrusion detection as it allows insights into possibly comprised user accounts or data theft. In general, IDS training data is created by extracting the user-transaction combinations over a set of historical log lines. Sanitized log L' is highly useful in that it is both differentially private and nevertheless expressive and useful for machine learning as further described below in connection with FIG. 4.

Figure 4:
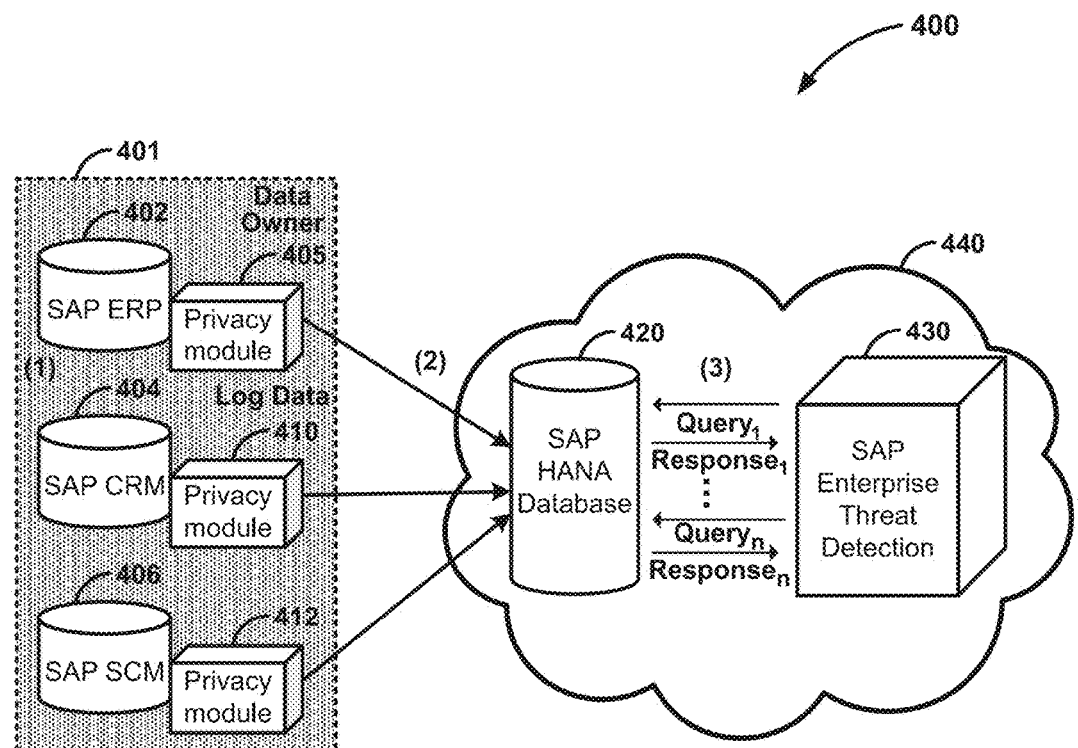
FIG. 4 is a block diagram illustrating a threat detection system using log data while preserving privacy of that log data.

FIG. 4 is a block diagram illustrating a threat detection system using log data while preserving privacy of that log data. In threat detection system 400, a data owner 401 controls an arbitrary number of applications systems such as the three SAP systems illustrated in FIG. 4. In an embodiment, these are SAP Enterprise Resource Planning ("ERP") system 402, SAP Customer Relationship Management ("CRM") system 404, and SAP Supply Chain Management ("CRM") system 406. Associated with these application systems are privacy modules 405, 410, and 412. In various embodiments, these privacy modules extract log data from the SAP systems and perform one-time, non-interactive epsilon-differentially private perturbation of data entries associated with the log data. In an embodiment, these perturbed data entries are then transmitted to SAP HANA database 420, which is then accessed by SAP Enterprise Threat Detection System ("ETDS") 430, which can be implemented on premise or in cloud 440. In various embodiments, the ETDS operates on perturbed data with the purpose of detecting threats to or attacks on one or more of the applications 402, 404, and 406. Because the data is anonymized, and de-identified the ETDS will not be able to identify a particular user account that may have been compromised, but it will be able to predict with some level of certainty whether or not an attack has occurred and/or is ongoing. If this determination has been made or predicted with a reasonable level of certainty, an administrator controlled by and trusted by data owner 401 can access the original unperturbed data and determine the identity of the account that is under attack or that has been compromised.

The ability for the ETDS 430 to operate on anonymized data has the additional advantage of allowing the ETDS 430 to use anonymized data from real systems that have come under attack. The ability to use this data allows for machine learning by the ETDS 430 so that it can detect similar types of attacks based on what it has learned from historical attacks. In an embodiment, once the ETDS 430 learns from historical data, it can be run in a trusted environment on unperturbed data or it can continue to run in connection with perturbed data until it determines that a threat has occurred based on the known utility of the perturbed data.

Evaluation of an Implementation

We performed several tests on a dataset which we created from the often-referenced dataset for detection of user masquerading from Matthias Shonlau, entitled "Masquerading User Data". In connection with the evaluation, fifty persons are sitting in front of a terminal and start doing their work independently from each other. The typed commands are being logged together with their corresponding timestamps. Every individual contributes the same amount of commands, namely 15000. Altogether the size of the dataset is 50·15000=750000 entries.

An extract from the resulting dataset can be seen in table 9.

TABLE 9

Dataset extract

| Name | Event Time | Command |
| --- | --- | --- |
| Octavia Virts | 11.09.1998 00:00:00.000 | cpp |
| Octavia Virts | 11.09.1998 00:07:18.527 | sh |
| Octavia Virts | 11.09.1998 00:09:53.950 | xrdb |
| Octavia Virts | 11.09.1998 00:10:30.411 | cpp |
| ... | ... | ... |

Figure 5:
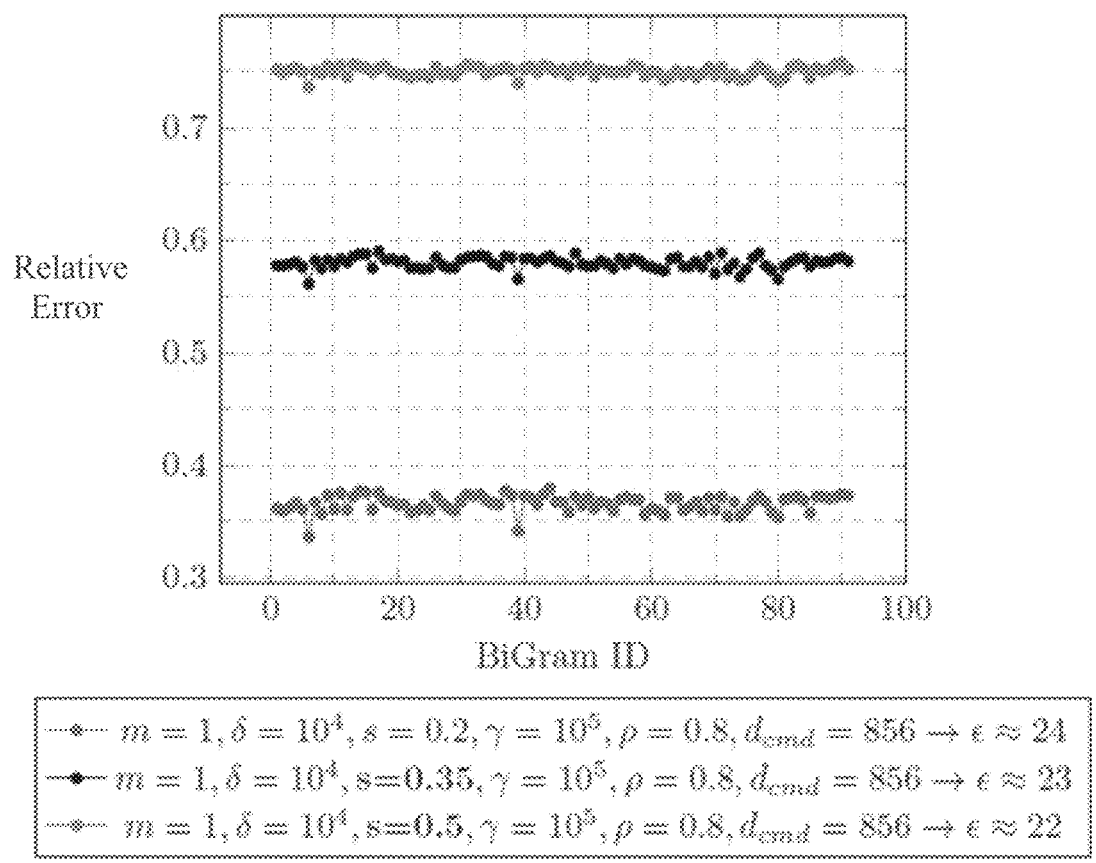
FIG. 5 is a plot of relative error of most frequent Bi-Grams (50 individuals) varying parameter s (the randomization probability parameter).
Figure 6:
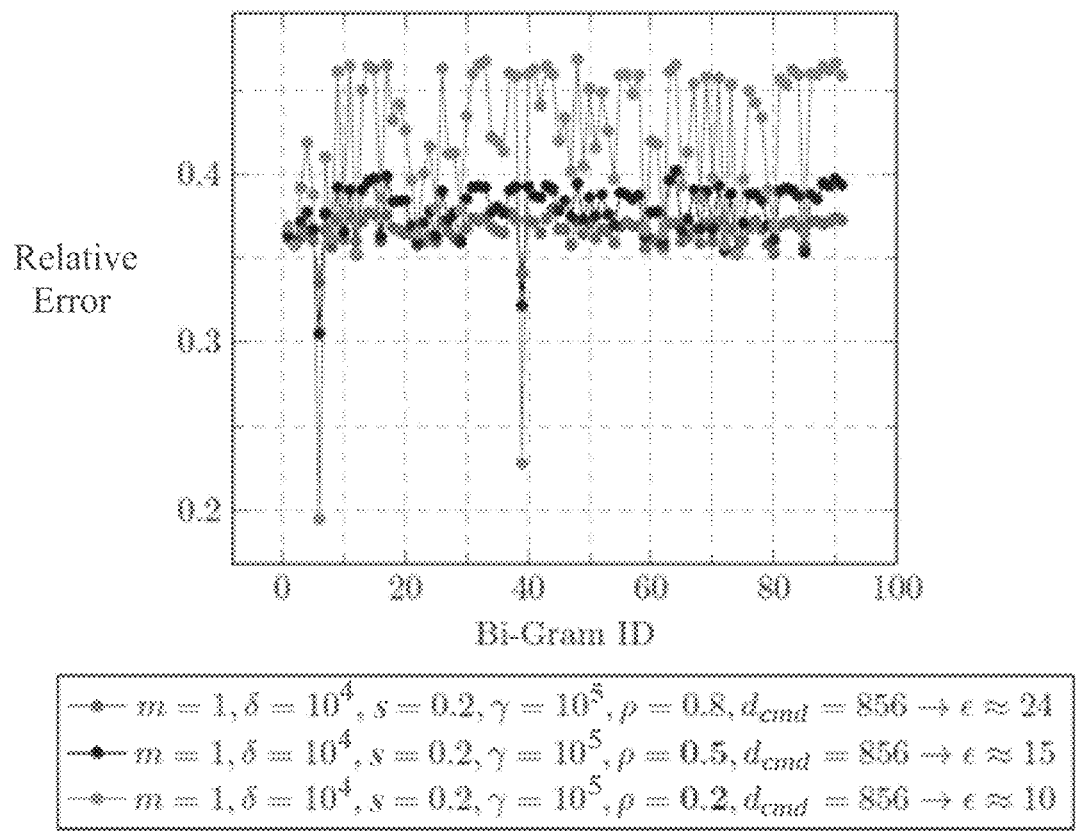
FIG. 6 is a plot of relative error of most frequent Bi-Grams (50 individuals) varying parameter p (the retention probability).

FIG. 5 is a plot of relative error of most frequent Bi-Grams (50 individuals) varying parameter s (the randomization probability parameter). Similarly, FIG. 6 is a plot of relative error of most frequent Bi-Grams (50 individuals) varying parameter p (the retention probability). It is noted that the present teachings enable preservation of the causality of events. With respect to the Schonlau dataset, this means preserving the time-ordering of commands. One way to depict the utility in terms of causality preservation is to compare the N-Grams of commands before and after perturbation. For the sake of simplicity we will take a look only on Bi-Grams within this evaluation.

Generally speaking, N-Grams are constructed by ordering commands by their timestamps, thus this evaluation does not only involve the parameter s, which depicts how strong the perturbation of a command is, but also the retention probability ρ together with the corresponding standard deviation of Laplacian noise of the timestamps. Meaning, the perturbation of both columns has an influence on the N-Grams, which we are going to study in the following. For the sake of simplicity we will compute epsilon as in theorem 1 only for the case of m=1 considering that epsilon for m>1 experiences simple linear growth. We use the notion of Relative Error/Difference of the absolute frequencies after perturbation. This notion is well known in the field of quality assurance and was also used in the related work for quantifying the utility loss (e.g., Rui Chen, "Differentially Private Sequential Data Publication via Variable-Length N-Grams" from 2012).

Definition 3 (Relative Error/Difference)

Let $S:=\{s_1, s_2, \ldots, s_{1k}\}$ be the set of original N-Gram frequencies and $S:=\{s_1^*, s_2^*, \ldots, s_{1k}^*\}$ be the set of frequencies of the same N-Grams after randomization, then the relative error is computed by the formula:

$$\text{error}(s_i, s_i^*) = \frac{|s_i - s_i^*|}{\max\{s_i, 0.01\}} \quad \text{Equation 9}$$

FIGS. 5 and 6 show that one can achieve different trade-offs, depending on the requirements. If the requirement is that preserving commands is more important than the timestamps one can reduce ρ and increase the retention probability parameter s, and vice versa. Moreover the error rates are acceptable and can potentially be even further improved by the supplementary application of randomized response estimation techniques.

TABLE 10

Top 10 commands (50 individuals)

Table 11: Original

| Command | Frequency |
|---|---|
| sh | 65197 |
| cat | 32188 |
| netscape | 32006 |
| generic | 30579 |
| ls | 29894 |
| popper | 24493 |
| sendmail | 20702 |
| date | 20103 |
| rm | 17383 |
| sed | 15942 |

Table 12: s = 0.2, $d_{cmd}$ = 856 → ε ≈ 8

| Command | Frequency | Relative Error |
|---|---|---|
| sh | 52298.9 | 0.197833 |
| cat | 25926.5 | 0.194529 |
| netscape | 25785.3 | 0.194360 |
| generic | 24614.3 | 0.195059 |
| ls | 24090.0 | 0.194153 |
| popper | 19773.4 | 0.192692 |
| sendmail | 16736.1 | 0.191571 |
| date | 16259.2 | 0.191205 |
| rm | 14067.0 | 0.190761 |
| sed | 12956.0 | 0.187304 |

Table 13: s = 0.35, $d_{cmd}$ = 856 → ε ≈ 7.3

| Command | Frequency | Rel. Error |
|---|---|---|
| sh | 42640.7 | 0.346 |
| cat | 21256.7 | 0.340 |
| netscape | 21089.5 | 0.341 |
| generic | 20173.6 | 0.340 |
| ls | 19758.4 | 0.339 |
| popper | 16209.3 | 0.338 |
| sendmail | 13745.8 | 0.336 |
| date | 13414.0 | 0.333 |
| rm | 11625.0 | 0.331 |
| sed | 10642.2 | 0.332 |

Table 14: s = 0.5, $d_{cmd}$ = 856 → ε ≈ 6.7

| Command | Frequency | Rel. Error |
|---|---|---|
| sh | 33113.7 | 0.492 |
| cat | 16547.8 | 0.486 |
| netscape | 16427.6 | 0.487 |
| generic | 15748.6 | 0.485 |
| ls | 15409.4 | 0.485 |
| popper | 12709.0 | 0.481 |
| sendmail | 10791.9 | 0.479 |
| date | 10461.7 | 0.480 |
| rm | 9108.7 | 0.476 |
| sed | 8444.5 | 0.470 |

Table 15: s = 0.8, $d_{cmd}$ = 856 → ε ≈ 5.3

| Command | Frequency | Rel. Error |
|---|---|---|
| sh | 13698.7 | 0.790 |
| cat | 7160.2 | 0.778 |
| netscape | 7135.8 | 0.777 |
| generic | 6826.6 | 0.777 |
| ls | 6645.9 | 0.778 |
| popper | 5583.4 | 0.772 |
| sendmail | 4789.8 | 0.769 |
| date | 4749.6 | 0.764 |
| rm | 4212.7 | 0.758 |
| sed | 3884.0 | 0.756 |

Top-K-Queries:

An important property of a set is the ranking of items within it. Though the set as a whole is usually preserved with our mechanism, the ranking of the top K items can undergo significant change. Tables 10-15 show that the ranking is retained on average (10 runs), though the relative error of the frequencies may be significant.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A method comprising:
providing sanitized log data derived from a log table to a threat detection system, the log table having at least one continuous column having continuous entries with continuous values;
selecting a retention probability parameter and an accuracy radius parameter;
initializing a probability distribution function with the retention probability parameter and the accuracy radius parameter;
for each continuous value in the continuous values applying the probability distribution function to the continuous value to compute a perturbed continuous value, resulting in at least one perturbed continuous column; and
providing the at least one perturbed continuous column as the sanitized log.

2. The method of claim 1, further comprising:
rounding the perturbed continuous value after adding floating-point Laplacian noise associated with the probability distribution function to the continuous value.

3. The method of claim 1, wherein the log table has at least one discrete column in addition to the at least one continuous column, the discrete column having discrete entries with discrete values, the method further comprising:
choosing a randomization parameter;
specifying a domain for possible discrete values;
for each discrete value in the discrete values, determining whether to keep the original discrete value or randomly selecting a value from the domain of possible values.

4. The method of claim 3, further comprising:
de-identifying the entries with discrete values.

5. A threat detection system comprising:
an intrusion detection system sensor that provides sanitized log data derived from a log table to the threat detection system, the log table having at least one continuous column having continuous entries with continuous values; and
a privacy module coupled to the intrusion detection system sensor and executing in a computing device that selects a retention probability parameter and an accuracy radius parameter, wherein the privacy module initializes a probability distribution function with the retention probability parameter and the accuracy radius parameter, wherein for each continuous value in the continuous values the probability distribution function is applied to the continuous value to compute a perturbed continuous value, resulting in at least one perturbed continuous column, and wherein the at least one perturbed continuous column is provided to an intrusion detection system repository that by way of queries and responses provides the sanitized log to at least one data analyst.

6. The threat detection system of claim 5, wherein the privacy module rounds the perturbed continuous value after adding floating-point Laplacian noise associated with the probability distribution function to the continuous value.

7. The threat detection system of claim 5, wherein the log table has at least one discrete column in addition to the at least one continuous column, the discrete column having discrete entries with discrete values, wherein the privacy module chooses a randomization parameter and specifies a domain for possible discrete values, and wherein for each discrete value in the discrete values the privacy module determines whether to keep the original discrete value or to randomly select a value from the domain of possible values.

8. The threat detection system of claim 7, wherein the entries with discrete values are de-identified.

9. The threat detection system of claim 8, wherein the entries with discrete values are de-identified before the value is randomly selected.

10. An enterprise application landscape comprising:
at least one enterprise software system;
an enterprise threat detection system that provides at least one data analyst with sanitized log data derived from a log table associated with the enterprise software system, the log table having at least one continuous column having continuous entries with continuous values; and
a privacy module coupled to a sensor and executing in a computing device that selects a retention probability parameter and an accuracy radius parameter, wherein the privacy module initializes a probability distribution function with the retention probability parameter and the accuracy radius parameter, wherein for each continuous value in the continuous values the probability distribution function is applied to the continuous value to compute a perturbed continuous value, resulting in at least one perturbed continuous column, and wherein the at least one perturbed continuous column is provided to an intrusion detection system repository that by way of queries and responses provides the sanitized log to the data analyst.

11. The enterprise application landscape of claim 10, wherein the privacy module rounds the perturbed continuous value after adding floating-point Laplacian noise associated with the probability distribution function to the continuous value.

12. The enterprise application landscape of claim 10, wherein the log table has at least one discrete column in addition to the at least one continuous column, the discrete column having discrete entries with discrete values, wherein the privacy module chooses a randomization parameter and specifies a domain for possible discrete values, wherein for each discrete value in the discrete values the privacy module determines whether to keep the original discrete value or to randomly select a value from the domain of possible values.

13. The enterprise application landscape of claim 12, wherein the entries with discrete values are de-identified.

14. The enterprise application landscape of claim 13, wherein the entries with discrete values are de-identified before the value is randomly selected.

\* \* \* \* \*